United States Patent [19]
Hall et al.

[11] 3,750,688
[45] Aug. 7, 1973

[54] VALVE AND METHOD FOR AQUEOUS SYSTEMS

[75] Inventors: Richard H. Hall, Midland; Daniel H. Haigh, Beaverton; Robert L. Derby; Walter E. Jennings, both of Midland, all of Mich.

[73] Assignee: The Dow Chemical Company, Midland, Mich.

[22] Filed: June 26, 1972

[21] Appl. No.: 266,300

[52] U.S. Cl. .................................. 137/2, 137/172
[51] Int. Cl. ............................................ B01d 13/00
[58] Field of Search ............... 137/172, 1, 2, 199, 137/197

[56] References Cited
UNITED STATES PATENTS

| | | | |
|---|---|---|---|
| 2,850,033 | 9/1958 | Hartle | 137/197 |
| 2,868,219 | 1/1959 | Lucks | 137/197 |

FOREIGN PATENTS OR APPLICATIONS

| | | | |
|---|---|---|---|
| 634,274 | 1/1962 | Canada | 137/172 |

*Primary Examiner*—Alan Cohan
*Attorney*—William M. Yates, R. B. Ingraham et al.

[57] ABSTRACT

A valve is disposed in a line carrying an aqueous stream. The valve is in the form of a permeable bed of particulate swellable polymer particles which imbibe organic materials and on contact therewith will swell to provide a positive shutoff.

12 Claims, 2 Drawing Figures

PATENTED AUG 7 1973 3,750,688

VALVE AND METHOD FOR AQUEOUS SYSTEMS

The contamination of water with oils and similar organic liquids has presented a substantial problem for a long period of time. In many instances it is desirable that an aqueous stream be generally oil- or organic-free, and that when such a stream becomes contaminated with an organic or oil-like liquid that it be shutoff as soon as possible in order to prevent spread of organic contamination. Such a valving situation is particularly desirable on water discharge lines which go to natural streams and on water input lines to processing facilities wherein organic contamination is observable.

It would be desirable if there were available an improved valve for aqueous lines which is responsive to organic liquid contamination.

It would also be desirable if there were an improved valve for use in aqueous streams which would close in the presence of organic liquids.

It would further be desirable if there were an improved valving method which prevented the flow of organic liquid-contaminated water in a conduit system.

These benefits and other advantages in accordance with the present invention are achieved in a method for the handling of an aqueous stream wherein the stream is passed through a conduit, the stream being subject to contamination with an organic liquid, the improvement which comprises interposing within the conduit a body of a swellable polymer, the body being permeable to the aqueous stream and being retained within the conduit, the body being swellable by an organic liquid to a degree sufficient to stop flow within the conduit.

Also contemplated within the scope of the present invention is a valving member, the valving member comprising a housing, the housing defining a cavity therein, the housing having an inlet and an outlet generally remotely disposed from each other and each in communication with the cavity, within the cavity a water permeable body of a swellable polymer which on contact with an organic liquid swells to a degree sufficient to prevent communication between the inlet and the outlet.

Further features and advantages of the present invention will become more apparent from the following specification taken in connection with the drawing wherein.

Figure 1:
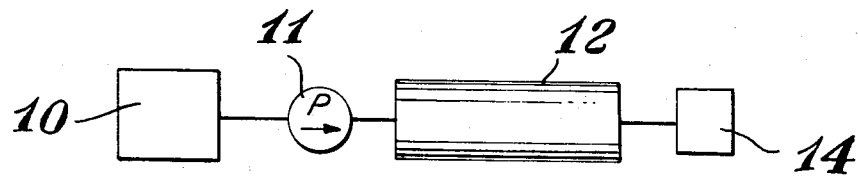
FIG. 1 is a schematic representation of the process of the invention.

In FIG. 1 there is schematically depicted operation of apparatus of the present invention. The reference numeral 10 designates a source of an aqueous fluid. The source 10 is in operative communication with forwarding means or a pump 11 which in turn is in communication with a valve in accordance with the present invention designated by the reference numeral 12. The valve 12 in turn discharges to a discharge receiver 14.

Figure 2:
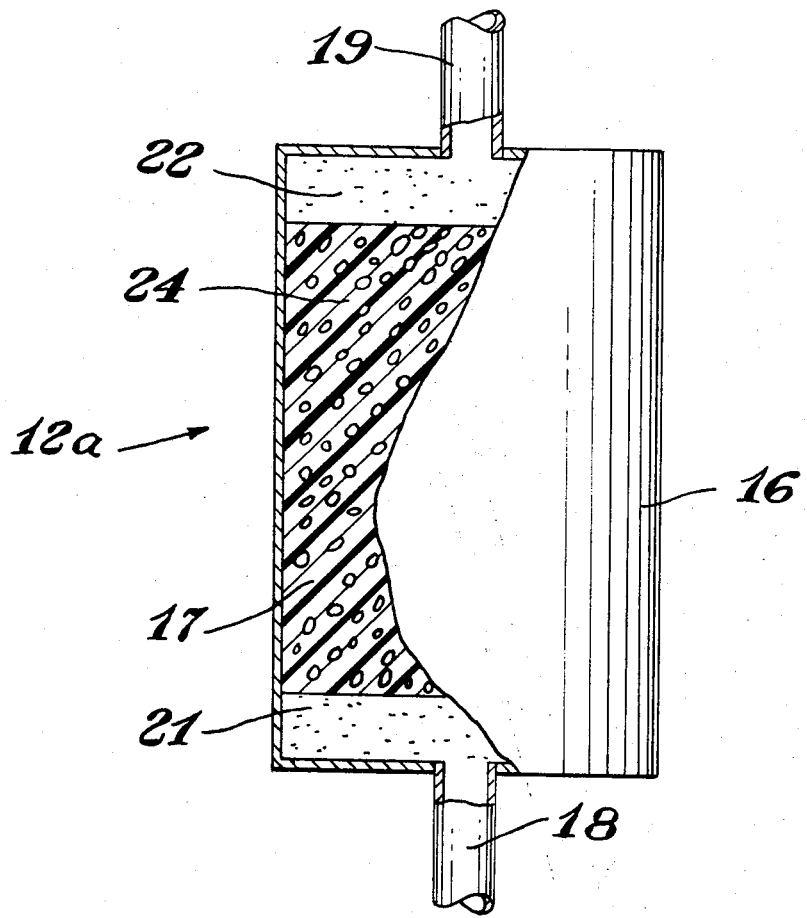
FIG. 2 is a schematic partially cut away view of a valving member in accordance with the present invention.

In FIG. 2 there is depicted a sectional representation of a valve in accordance with the present invention generally designated by the reference numeral 12a. The valve 12a comprises a housing 16. The housing 16 defines an internal cavity 17. A first conduit or inlet 18 is in operative communication with the cavity 17 and a second conduit or outlet 19 is also in communication with the cavity 17 and is generally remotely disposed from the conduit 18. A first foraminous retaining means 21 is disposed generally adjacent the inlet 18 and a second foraminous support member 22 is disposed adjacent the outlet 19. Beneficially, the foraminous retaining means are of conventional structure such as screen, particulate material such as sand, pebbles and the like. Disposed between the support members 21 and 22 is a body 24 of a polymer which is capable of swelling on contact with organic liquids. The support members 21 and 22 prevent any significant axial movement of the body 24 within the conduit.

In the operation of the valve as depicted in FIGS. 1 and 2, an aqueous stream flows from the source 10 through the forwarding means 11 into the valve 12 and in turn is discharged into the receiver 14. When organic contamination occurs in the stream entering the valve 12 the organic material, or at least a substantial portion thereof, is imbibed by the body 24 causing the body to swell. As the body is confined and restrained within the cavity 17 the spaces and passageways within the body are decreased in size and finally closed completely, thereby providing an effective shutoff valve. The addition of instrumentation or controls (which are responsive to pressure increase as the body swells) for any particular situation is well within the means of anyone skilled in the art.

Polymers useful in the practice of the present invention are any polymers which are water insoluble and which swell on contact with organic liquids. Useful polymers may swell on contact with water. However, additional swelling must occur when contacted with an organic liquid. Selection of a polymer for use with any organic liquid is readily accomplished by determining a swelling index for the polymer particles. Beneficially, such a swelling index is readily determined by immersing a particulate polymer to be evaluated in water until the polymer has reached equilibrium swelling and subsequently adding the desired organic liquid and determining the volume per unit weight of polymer after a period of 30 minutes with water and organic liquid and the volume per unit weight of the polymer when in equilibrium with water. The ratio of the volume per unit weight with organic liquid and water to volume per unit weight of the polymer with water provides the swelling index. If the polymer is soluble the swelling index is infinite. If the swelling index is greater than about 1.2 the polymer particles are useful in the practice of the present invention. Beneficially for most applications a swelling index of at least 1.5 and preferably greater than about 3 is desirable. It is not critical to the practice of the present invention to employ a cross-linked polymer which swells but does not dissolve. If the polymer swells in the presence of the organic liquid and water it is suitable for the practice of the present invention. However, for most applications it is desirable to employ a polymer which is cross-linked to a sufficient degree that it exhibits a swelling index between about 1.5 and 50 and preferably between about 3 and 50. By utilizing the cross-linked polymer the hazard of dissolution of the polymer over extended periods of time is eliminated. However, for many applications, particularly those wherein instrumentation is employed to detect the pressure drop and an organic liquid contamination in water stream will appear in relatively large quantities, uncross-linked polymer is eminently satisfactory. A wide variety of polymeric materials are employed with benefit. Such polymers include polymers of styrenes and substituted styrenes; copolymers of vinyl chloride such as a copolymer of 60 weight percent vinyl chloride and 40 weight percent vinyl acetate; vinylidene chloride copolymers such as a copolymer of 75 percent vinylidene chloride and 25 percent acrylonitrile; acrylic polymers such as polymers of methylmethacrylate, ethyl acrylate and the like. In general the chemical composition of the polymers is not critical. The polymers must show significant swelling; that is, at least a 25 percent increase in volume in a period of at least 10 minutes in the organic liquid to which the polymers are required to respond under desired service conditions of temperature and pressure. Particularly advantageous materials which respond to a wide variety of organic liquids are polymers of styrene such as polystyrene and polymers of styrene and divinylbenzene containing up to about 10 weight percent divinylbenzene. For general use with aliphatic and aromatic hydrocarbons, alkylstyrene polymers are of particular benefit. Such alkylstyrene polymers swell very rapidly on contact with aliphatic and/or aromatic hydrocarbons. Generally the more rapid the swelling of the polymer the more rapid the shutoff when the organic liquid is contacted. Alkylstyrene polymers usually show substantial swelling when in contact with organic liquids in less than 1 minute.

Preferably, cross-linked polymers of styrenes, and advantageously of tertiary-alkylstyrenes, are utilized as the imbibing agent in the process of this invention. Those alkylstyrenes which can be used to prepare these polymers have alkyl groups containing from four to 20, and preferably from four to 12, carbon atoms, such as: tertiary-alkylstyrenes including for example, p-tert-butylstyrene, p-tert-amylstyrene, p-tert-hexyl-styrene, p-tert-octylstyrene, p-tert-dodecylstyrene, p-tert-octadecylstyrene, and p-tert-eiscosylstyrene; n-alkylstyrenes including for example n-butylstyrene, n-amylstyrene, n-hexylstyrene, n-octylstyrene, n-dodecyl-styrene, n-octadecylstyrene, and n-eicosylstyrene; sec-alkystyrenes including for example sec-butylstyrene, sec-hexylstyrene sec-octylstyrene, sec-dodecylstyrene, sec-octadecylstyrene, and sec-eicosylstyrene; isoalkyl-styrenes including for example isobutylstyrene, iso-amylstyrene, isohexylstyrene, isooctylstyrene, isododecyl-styrene, isooctadecylstyrene, and isoeicosylstyrene; and copolymers thereof.

Especially preferred for use in the practice of the invention are cross-linked copolymers of such alkylstyrenes as heretofore described and an alkyl ester derived from $C_1$ to $C_{18}$ alcohol and acrylic or methacrylic acid or mixture thereof.

Suitable monomers which may be employed as comonomers with the alkylstyrene include such materials as vinylnaphthalene, styrene, $\alpha$-methylstyrene, ring-substituted $\alpha$-methylstyrenes, halostyrenes, arylstyrenes and alkarylstyrenes; methacrylic esters, acrylic esters, fumarate esters and half esters, maleate esters and half esters, itaconate esters and half esters, vinyl biphenyls, vinyl esters of aliphatic carboxylic acid esters, alkyl vinyl ethers, alkyl vinyl ketones, $\alpha$-olefins, isoolefins, butadiene, isoprene, dimethylbutadiene, acrybnitrile, methacrylonitrile and the like.

It is desirable that the polymers used in the process of the invention contain a slight amount of cross-linking agent, preferably in the range of from about 0.01 to 2 percent by weight. The most efficient imbibition of organic liquid contaminants occurs when the level of cross-linking agent is less than about 1 percent since this permits the polymers to swell easily and imbibe a substantial volume of the organic material. When organic liquid-contaminated water is percolated through a packed column or bed of only polymer particles, up to 2 percent cross-linking agent is satisfactory because a lower volume of organic material imbibed by the polymer can be tolerated in this type of operation.

Cross-linking agents which can be used in preparing the imbibing polymers suitable for use in the present invention include polyethylenically unsaturated compounds such as divinylbenzene, diethylene glycol dimethacrylate, diisopropenylbenzene, diisopropenyldiphenyl, diallylmaleate, diallylphthalate, allylacrylates, allylmethacrylates, allylfumarates, allylitaconates, alkyd resin types, butadiene or isoprene polymers, cyclooctadiene, methylene norbornylenes, divinyl phthalates, vinyl isopropenylbenzene, divinyl biphenyl, as well as any other di- or poly-functional compound known to be of use as a cross-linking agent in polymerica vinyl-addition compositions. Normally, the polymer containing the cross-linking agent swells with the imbibed organic material. If there is too much cross-linking agent, the imbibition takes an unreasonably long time or the polymer is unable to imbibe a sufficient quantity of the organic liquid and closes the interstitial spaces in the bed. If the imbibitional polymer contains no cross-linking agent or too little cross-linking agent, then it will dissolve eventually in the organic material resulting, for example, in a non-discrete, non-particulate mass of polymer-thickened organic liquid. However, for many applications where closure of a line is quickly noticeable uncross-linked material is satisfactory.

Polymers for the practice of the method of the present invention may be prepared by any convenient technique, either suspension, emulsion or mass polymerization. Generally, the method of preparation is selected to provide polymer in the most convenient form for any particular application. Thus, if it is desired to have free-flowing, readily packed beads, generally suspension polymerization is employed to provide a plurality of small beads. If it is desired to obtain a bed having the maximum amount of polymer surface and a relatively high permeability rate toward water carrying an organic liquid, it is oftentimes desirable to employ an emulsion polymerization technique and recover the polymer by spray drying. If it is desired to obtain a body of predetermined configuration, it is oftentimes beneficial to employ a mass polymerization technique wherein a polymer-insoluble diluent is employed. Techniques for the preparation of such porous polymers are disclosed in U.S. Pat. No. 3,322,695, the teachings of which are herewith incorporated by reference. Such porous polymers can also be prepared by either suspension or mass polymerization. Alternately, satisfactory beads are prepared by mass or suspension polymerization with subsequent comminution of the polymer prepared by the mass technique. The particle size of such polymers is selected in accordance with the desired application, larger particles being employed for deep, high permeability beds, smaller particles for high absorption and lower permeability. For most applications such particles are from about 0.1 to 5 millimeters in diameter. Alternately, porous polymer beds may be polymerized in desired shapes in the manner of U.S. Pat. No. 3,322,695.

Various methods of carrying out the process of the present invention will be readily apparent to those skilled in the art.

The alkylstyrene body utilized in the practice of the method of the invention and the valve in accordance with the invention can have a wide variety of forms varying from a packed particulate bed suitably supported to prevent significant motion under the influence of the stream passing therethrough, to a foraminous molded body which may have the form of a plurality of grids or a body of parallel rods or tubes. Usually for most applications a packed bed of beads is satisfactory. The alkylstyrene body may contain inert material; that is, material which is not swellable by water or organic liquid in a proportion up to about 80 volume percent when lightly cross-linked alkylstyrene polymers are employed. For example, a mixture of 25 volume percent t-butylstyrene beads and 75 volume percent sand rapidly closes a conduit when in contact with an organic liquid such as kerosene. The amount of inert material which can be tolerated is dependent upon the swelling capabilities of the beads. Thus if relatively highly cross-linked rigid beads are employed a much smaller quantity of inert diluent can be utilized than in the case where beads are employed which will swell up to 40 times their original volume.

The following examples are intended to illustrate but not limit the present invention.

EXAMPLE 1

Suspension polymerized t-butylstyrene polymer is prepared in the following manner: a reaction mixture of 2,000 parts of deionized water; 8 parts hydroxymethylcellulose having a solution viscosity of 400 centipoise 2 weight percent solution in water at 25° C.; 0.2 part potassium dichromate; 1 part benzoyl peroxide; one-half part divinylbenzene and 900 parts p-t-butylstyrene. The reaction vessel is a generally spherical flask having four creases formed therein. The reaction vessel is fitted with an agitator reflux condenser. The reaction vessel is purged with nitrogen to remove any dissolved oxygen. The mixture with agitation is then heated to 80° C. and maintained at 80° C. for a period of 16 hours. The temperature of the reaction mixture is subsequently raised to 90° C. and the temperature maintained for a period of 4 hours. The reaction mixture is then cooled to about 30° C., filtered and washed with water to remove the suspending agent and subsequently washed with methanol and dried in an air oven at a temperature of about 40° C. The beads have an average diameter of about 150 microns, and on microscopic examination appear as a solid. A valve is prepared generally in accordance with that depicted in FIG. 2 having a diameter of about 4 inches, employing screen as support members. A centrifugal pump is employed to forward water through the bed of imbibitive beads which is about 4 inches thick within the valve. A pressure drop across the bed of about 1 pound per square inch is observed. A small but unmeasured amount of kerosene is introduced into the water being fed to the valve. Approximately four seconds after the introduction of the kerosene-contaminated water into the valve flow of the contaminated water ceases.

EXAMPLE 2

When the procedure of Example 1 is repeated, with the exception that kerosene is replaced with Michigan sour crude oil, the flow stops with no oil seepage approximately 8 seconds after introduction.

EXAMPLE 3

The procedure of Example 1 is repeated, with the exception that instead of kerosene, toluene is introduced. The flow stops within about 3 seconds after the introduction of toluene into the bed and no seepage is observed.

EXAMPLE 4

The procedure of Example 1 is repeated, with the exception that the bed depth is reduced to one inch and toluene is employed in place of kerosene. Flow stops with no observed seepage in about 4 seconds.

EXAMPLE 5

The procedure of Example 1 is repeated with the exception that toluene replaces kerosene and the bed is a 1:1 by volume mixture of t-butylstyrene beads and sand. Flow stops without seepage in about 5 seconds.

EXAMPLE 6

The procedure of Example 5 is repeated with the exception that sand is replaced with particulate polyethylene. Similar results are obtained.

EXAMPLE 7

The procedure of Example 1 is repeated with the exception that the bed and the valve are beads of a polymer of 50 mole percent t-butylstyrene and 50 mole percent methylmethacrylate and 0.1 mole percent divinylbenzene, based on the total weight of the monomers. Similar beneficial results are obtained.

EXAMPLE 8

The procedure of Example 8 is repeated with the exception that the bed is diluted with 50 volume percent sand. Similar beneficial results are obtained.

EXAMPLE 9

The procedure of Example 1 is repeated with the exception that sytrene replaces kerosene and the bed is a bed of a polymer of vinyl toluene polymerized with 0.05 parts by weight divinylbenzene as cross-linking agent. Flow stops with no observed seepage in about 4 seconds after introduction of the toluene into the bed.

EXAMPLE 10

The procedure of Example 1 is repeated with the exception that cyclohexanone is employed as the solvent and the bed is a particulate polymer of equal parts by weight of isobutylacrylate, methylmethacrylate and acrylonitrile copolymerized with 0.05 parts by weight divinylbenzene, based on the total weight of the isobutylacrylate, methylmethacrylate and acrylonitrile. Flow stops with no observed seepage after about 6 seconds.

EXAMPLE 11

The procedure of Example 1 is repeated with the exception that chlorobenzene replaces kerosene and the bed is a particulate polymer of chlorostyrene polymerized in the presence of 0.05 weight percent divinylbenzene. Flow stops within about 3 seconds after introduction of the chlorobenzene and no seepage is observed.

EXAMPLE 12

The procedure of Example 1 is repeated with the exception that gasoline replaces the kerosene and the polymer bed is a particulate polymer of 4-(1-ethyl--1-methylpentyl)styrene polymerized in the presence of 0.05 weight percent divinylbenzene. Flow stops with no observed seepage in about 3 seconds.

EXAMPLE 13

The procedure of Example 1 is repeated with the exception that the bed is a polymer of 4-(1-ethyl--1-methylpropyl)styrene polymerized in the presence of 0.05 weight percent divinylbenzene. Flow stops within about 4 seconds.

EXAMPLE 14

The procedure of Example 1 is repeated with the exception that the polymer bed is a particulate polymer of 4-(1,1-dimethylpropyl)styrene polymerized in the presence of 0.05 weight percent divinylbenzene. Flow stops with no observed seepage in about 4 seconds.

EXAMPLE 15

The procedure of Example 1 is repeated with the exception that ethyl benzene replaces kerosene and the bed is a particulate polymer of styrene polymerized in the presence of 0.025 weight percent divinylbenzene. Flow stops without seepage after about 3 seconds.

EXAMPLE 16

The procedure of Example 1 is repeated with the exception that methylisobutyl ketone replaces the kerosene and the bed is a polymer prepared by the polymerization of equal parts of styrene, methylmethacrylate and acrylonitrile in the presence of 0.05 weight percent divinylbenzene. Flow stops without seepage after about 6 seconds.

EXAMPLE 17

The procedure of Example 1 is repeated with the exception that benzene replaces kerosene and the bed is a polymer of about 3 parts by weight styrene to about one part by weight acrylonitrile polymerized in the presence of 0.05 weight percent divinylbenzene. Similar beneficial results are obtained.

Similar beneficial results and advantages are achieved when employing the hereinbefore described polymers in the manner of the examples.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. In a method for handling an aqueous stream wherein the stream is passed through a conduit, the stream being subject to contamination with an organic liquid, the improvement which comprises
   interposing within the conduit a body of a swellable polymer, the body being permeable to the aqueous stream and being retained within a conduit, the body being swellable by an organic liquid to a degree sufficient to stop flow within the conduit.

2. The method of claim 1 wherein the body of polymer is a body of akylstryene polymer particles.

3. The method of claim 1 wherein the body contains up to about 80 volume percent of non-swellable material.

4. The method of claim 1 wherein the body is a mixture of poly-t-butylstyrene polymer particles and sand in admixture.

5. The method of claim 1 wherein the organic liquid is a hydrocarbon liquid.

6. A valving member, the valving member comprising a housing, the housing defining
   a cavity therein, the housing having
   an inlet and
   an outlet generally remotely disposed from each other and each in communication with the cavity, within within cavity
   a water permeable body of a swellable polymer which on contact with an organic liquid swells to a degree sufficient to prevent communication between inlet and outlet.

7. The valving member of claim 6 disposed in a conduit carrying water.

8. The valving member of claim 6 wherein the polymer is an alkylstyrene.

9. The valving member of claim 6 wherein the polymer is a poly-t-butylstyrene.

10. The valving member of claim 6 wherein the water permeable body is a mixture of a particulate alkylstyrene polymer and an inert particulate solid.

11. The valving member of claim 10 where the alkylstyrene polymer is poly-t-butylstyrene and the inert particulate solid is sand.

12. The valving member of claim 6 wherein the water permeable body is supported in fixed position by at least one foraminous support.

* * * * *